UNITED STATES PATENT OFFICE.

FRITZ MACHENHAUER, OF REDDISH, NEAR MANCHESTER, COUNTY OF LANCASTER, ENGLAND.

MANUFACTURE OF ROSANILINE DERIVATIVES.

SPECIFICATION forming part of Letters Patent No. 308,912, dated December 9, 1884.

Application filed April 8, 1884. (No specimens.)

*To all whom it may concern:*

Be it known that I, FRITZ MACHENHAUER, a subject of the Queen of Great Britain, residing at Reddish, near Manchester, in the county of Lancaster, England, chemist, have invented certain new and useful Improvements in the Manufacture of Rosaniline Derivatives; and I do hereby declare that the following is a full, clear, and exact description of the invention, which will enable others skilled in the art to which it appertains to make and use the same.

My invention has for its object the production of new yellow coloring-matters from the triphenylated substitution products of the rosanilines, more particularly the blue coloring-matter which is obtained by heating aurin with aniline, and is known in commerce under the name of "azuline." The preparation of the said yellow coloring-matters I effect by two methods. First, I take azuline in suitable solution, preferably heated—for instance, glacial acetic acid—and act upon it with nitric or nitrous acids or their salts until the blue color has changed into a yellow. The yellow coloring-matter separates on cooling or may be precipitated by the addition of water to the solution.

The following proportions will give a good result, although they may be materially varied: azuline, one part; glacial acetic acid, twenty parts; nitric acid, (or an equivalent quantity of nitrous acid, nitrate, or nitrite,) three parts. Second, the sulphonic acids obtained by heating azuline with sulphuric acid, I, after the addition of water and with or without previous separation of the excess of sulphuric acid, treat with nitric or nitrous acids or their salts, the quantity of the latter being dependent on the concentration of the aqueous solution of the blue sulphonic acids and on the temperature at which the reaction takes place.

The following proportions and temperature I find to give good results, although they may be varied without much affecting the result: azuline sulphonic acids, obtained by heating together azuline, one part, and sulphuric acid, five parts, until soluble in water; water, twenty parts; nitric acid, (or an equivalent quantity of nitrous acid, nitrate, or nitrite, two parts.) The nitric or nitrous acids or an equivalent quantity of their salts I add to the aqueous solution, which is raised to a temperature of about 212° Fahrenheit (two hundred and twelve degrees Fahrenheit.) After the reaction has subsided the excess of sulphuric acid present is separated in the ordinary manner well known to chemists, and the yellow sulphonic acids obtained I either utilize as such in the free state or after conversion into their alkaline salts.

Having fully described the nature of my invention and the manner of performing the same, what I desire to claim and secure by Letters Patent of the United States is—

The manufacture of yellow coloring-matters from the blue coloring-matter known in commerce under the name of "azuline," and the sulphonic acids thereof, by the process of treating the said products or their sulphonic acids with nitric or nitrous acids or their salts, substantially as herein described.

The foregoing specification of my improvements in the manufacture of yellow coloring-matters signed by me the 26th day of March, 1884.

FRITZ MACHENHAUER.

Witnesses:
C. A. BARLOW,
J. WALKEY GILLETT,
*Both of the Patent Office,* 17 *St. Ann's Square, Manchester.*